Patented Feb. 20, 1951

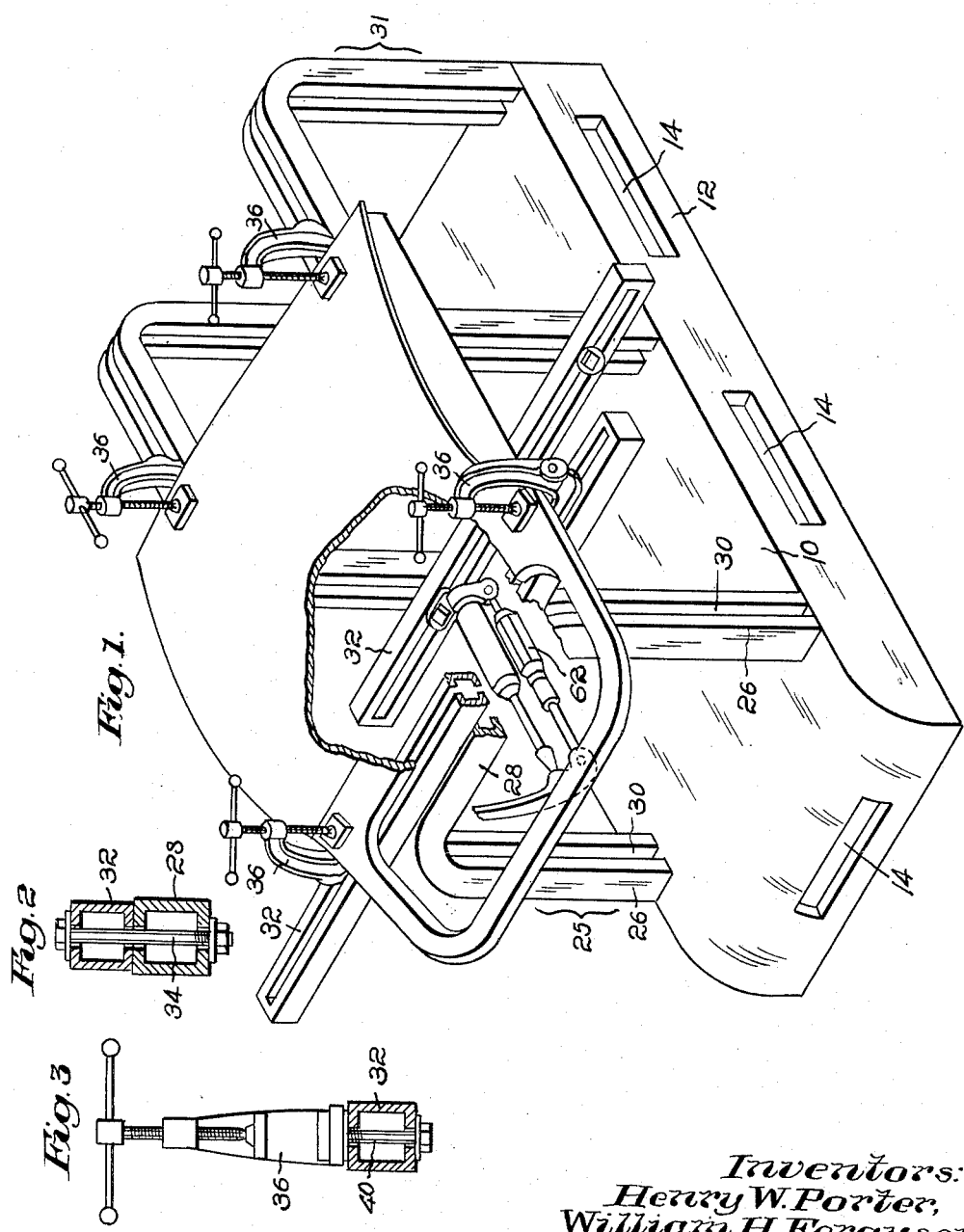

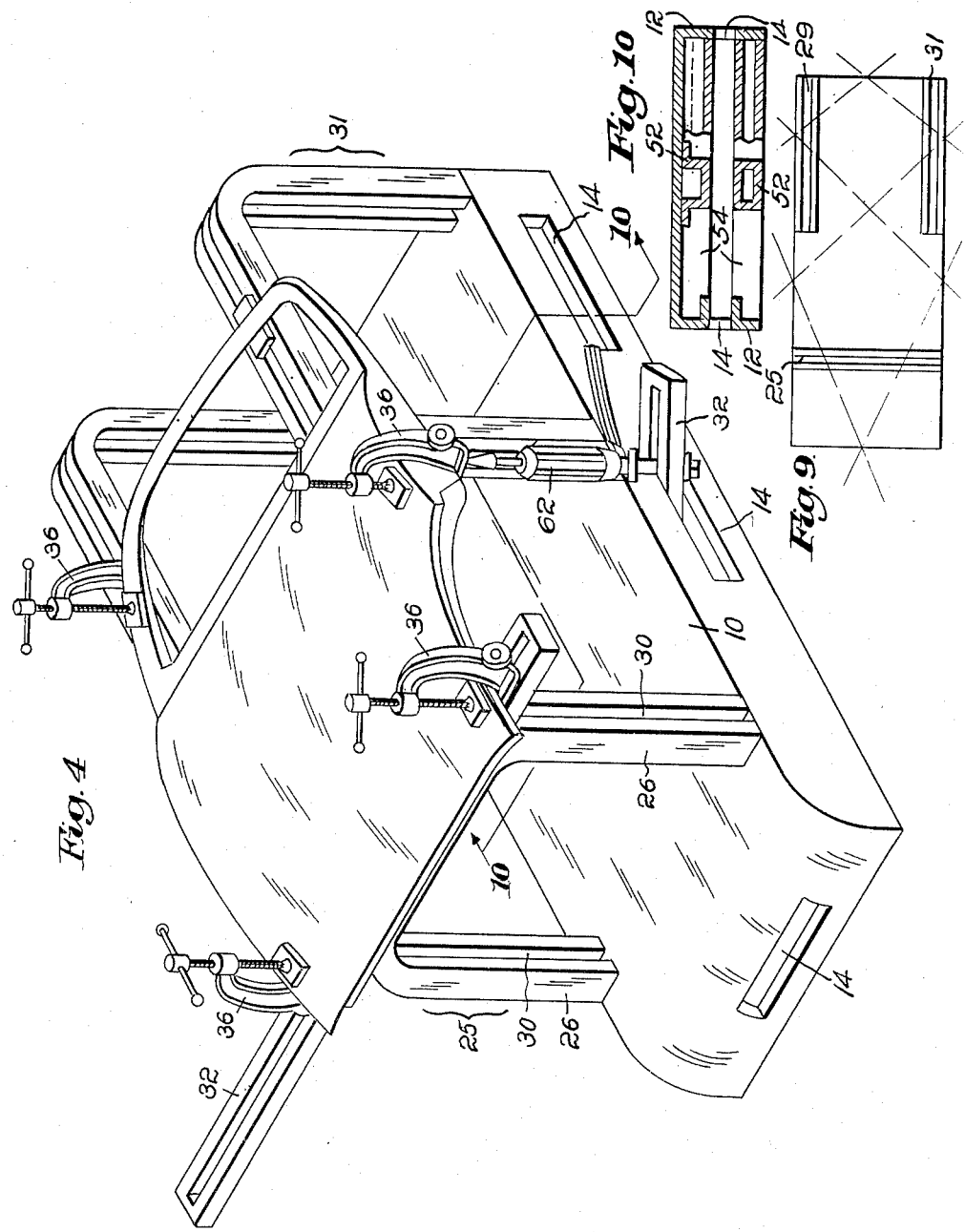

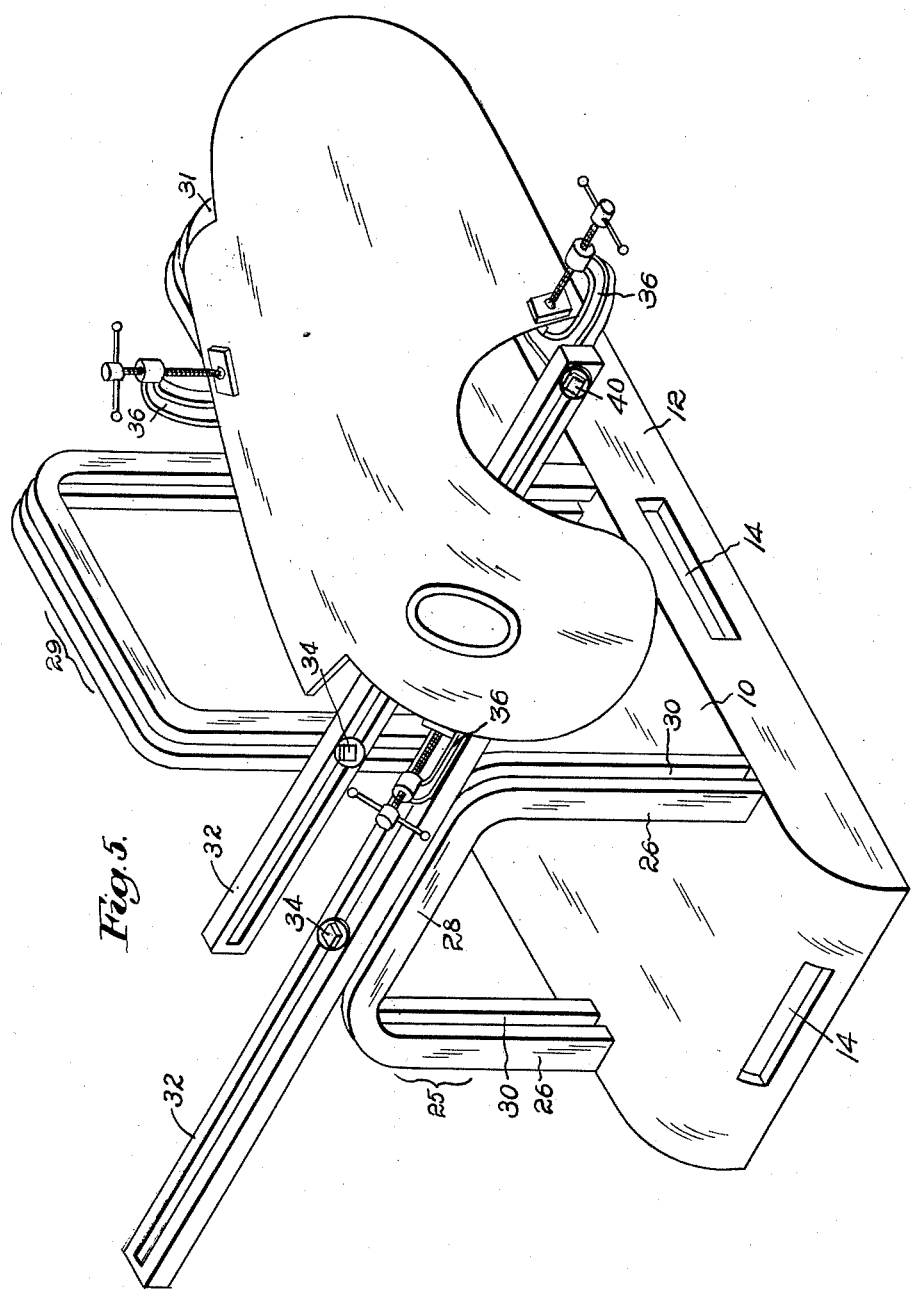

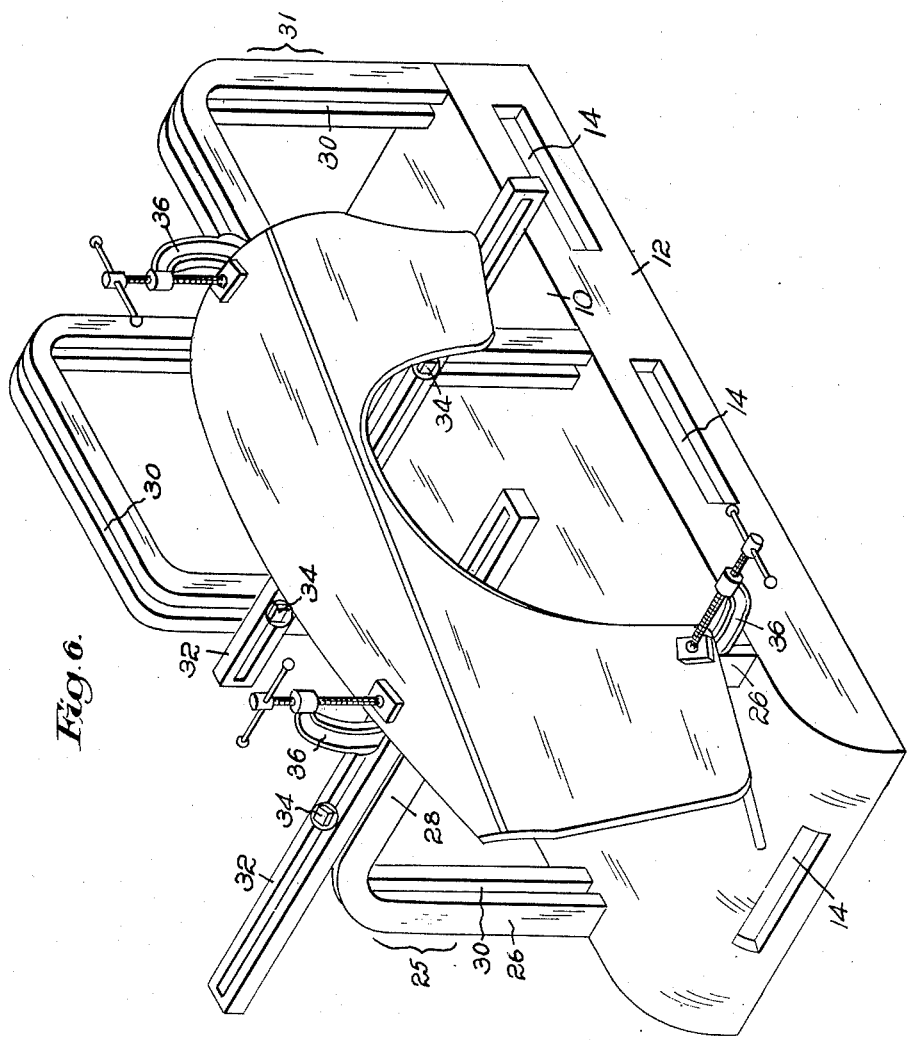

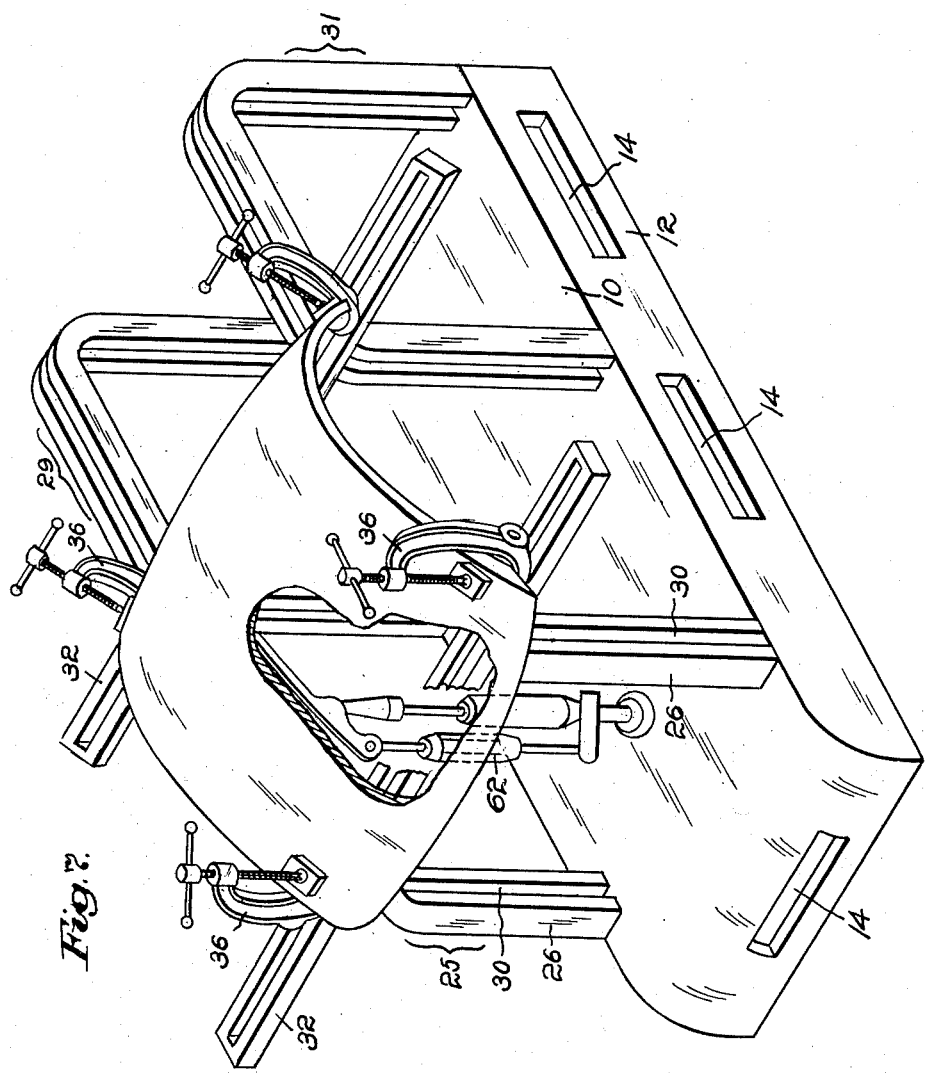

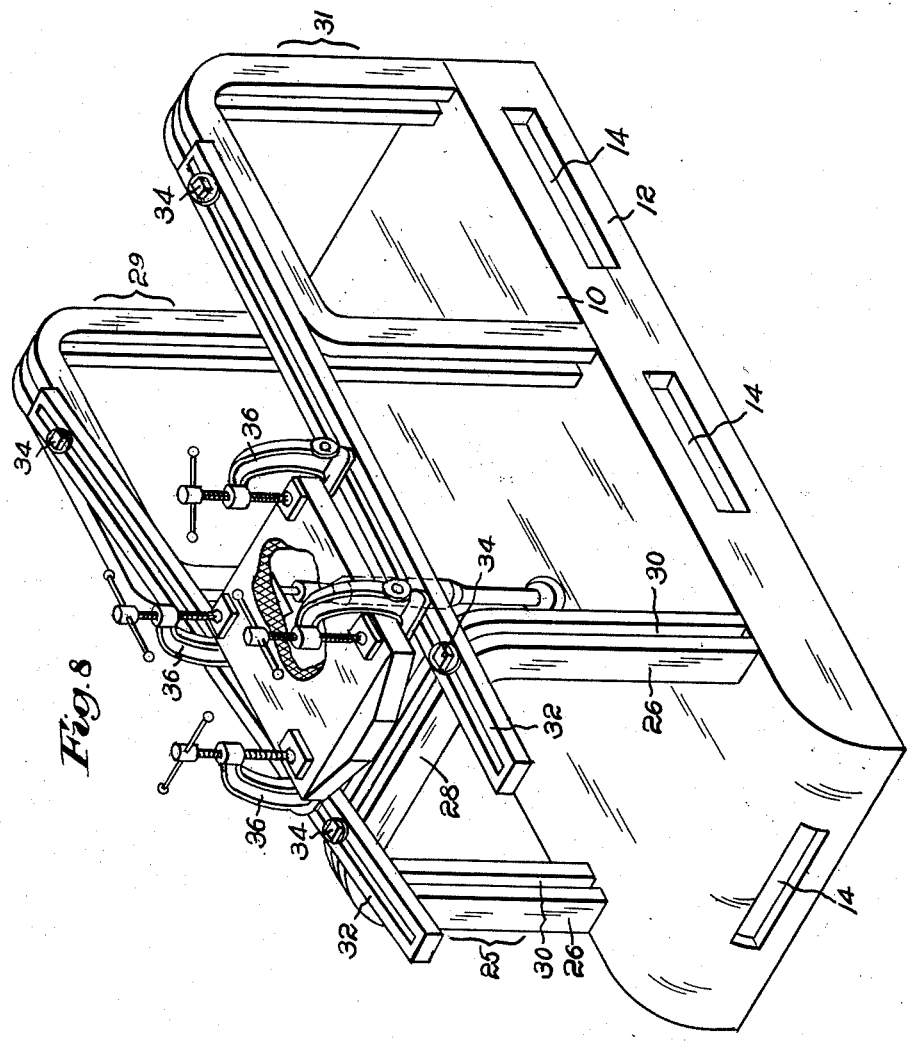

2,542,836

UNITED STATES PATENT OFFICE 2,542,836

APPLIANCE FOR POSITIONING AUTOMOBILE PARTS FOR REFORMING OPERATIONS

Henry W. Porter, Brookline, Mass., and William H. Ferguson, Flint, Mich., assignors to H. K. Porter, Inc., Everett, Mass., a corporation of Massachusetts Application August 3, 1944, Serial No. 547,944

13 Claims. (Cl. 29—288)

This invention relates to appliances useful in the repairing of automobile bodies, and the object is to provide an appliance particularly adaptable for facilitating repairing and finishing operations which are performed on automobile body parts which have been dented, bent or crushed and which require restoration. The device is in some respects similar to that disclosed in the patent to Ferguson 2,275,894 and we may utilize in connection therewith appliances such as are shown in that patent and in the Ferguson Patent 2,311,042, but we provide a more versatile construction capable of a wider variety of applications in use on account of its novel mechanical construction.

Our invention will be well understood by reference to the following description taken in connection with the accompanying drawings, wherein:

Fig. 1 is a perspective view of the appliance with an automobile door positioned thereon for straightening the upper frame construction of the door;

Fig. 2 is a section through one of the frames of the appliance illustrating the method of attaching a beam ("door bar") thereto;

Fig. 3 is a similar section showing a C clamp secured directly to one of the frames;

Figs. 4 to 8 inclusive are views similar to Fig. 1 showing different applications;

Fig. 9 is a diagrammatic plan on a reduced scale; and

Fig. 10 is a section on line 10—10 of Fig. 4.

Referring to the drawings, the appliance there shown comprises a base having a floor 10 of rigid construction so that it will resist the strains which are set up by the use of jacks and similar devices in the operations of bending automobile body parts to straighten the same, the floor being surrounded by depending flanges 12. Horizontally elongated slots 14 may be formed in these flanges for a purpose which will appear. Adjacent one end of the base, at the left in the figures, there arises a rigid frame 25 in the general shape of an inverted U with uprights 26 and a horizontal member 28. Preferably, as herein shown, the shape is more specifically that of a U in that these parts merge into each other along easy curves of substantial radius, as illustrated in the drawings. Remote from the end which carries this transverse frame and along the sides of the base there are disposed two longitudinally spaced frames 29 and 31 of generally similar construction parallel to but spaced from each other, the plane of each preferably containing one of the uprights 26 of the transverse frame 25. Between these two longitudinal frames and the transverse frame there is a substantial working space unobstructed from either side.

Rigid beams 32 or C clamps 36 similar to those shown in the two Ferguson patents above referred to are adapted to be anchored to these frames at any points thereof throughout their lengths including the curvilinear shoulder portions where the horizontal elements merge into the uprights. Preferably, as shown in Figs. 2 and 3, each frame comprises a pair of channels with their flanges opposed but slightly spaced to provide a through slot 30 between the same to receive, for instance, clamping bolts 34 for securing a rigid beam 32 or, as seen in Fig. 3, a clamping bolt 40 adapted to engage the base of a C clamp 36, which base will seat on the outer flanges of the two channels. While the channels may be suitably tied together at intervals, essentially they present a continuous slot 30 throughout their length so that the bolts 30 or 40 may be positioned at any point desired.

The form of the beam 32 herein illustrated and of the clamps 36 may be the same as is described in the Ferguson Patent 2,311,042 and they require no extended description herein. We herein refer to the part 32 as a beam to harmonize with the language of that patent although such beams are frequently termed "door bars" by users thereof, a name, however, which suggests a more limited utility for them than they in fact have in practice.

Referring now to Fig. 1, we have there illustrated one application of the improved appliance wherein it will be seen that a beam 32 is mounted on the transverse frame 25 and on this beam two C clamps 36 much as in Patent 2,275,894, and these clamps engage an automobile door adjacent the belt line. The bottom of the door extends over the frames 29 and 31 and is secured to each of them by a C clamp in vertical position engaging the bottom edge of the door. The window frame is thus in overhanging position toward the reader in the figure. Another beam 32 is shown secured to the vertical faces of the frames 29 and 31 by means of bolts 34, each passing through the longitudinal slot in the beam and the space between the two channels which form a frame, and this beam forms a support for a power spoon or jack 62, here illustrated as of the type shown in the Ferguson Patent 2,211,341, by means of which the header of the frame may be pushed downwardly and toward the left, viewing the figure. The door is held rigidly while pressure is applied to the upper door frame construction substantially in a horizontal plane. It will be noted that the jack 62 and the bar 32 which supports it may be adjusted up and down or sidewise, thus permitting the entire upper section to be aligned from this position without any danger of distorting the lower panel of the door.

In Fig. 4 there is shown an example of the use of one of the slots 14 in the flanges of the base. Here a beam and clamps are supported on the transverse frame 25 substantially as before and secure the bottom edge of a rear sedan door, the nearer clamp in the figure being placed adjacent the cut-out defined by the wheel housing. The upper portion of the door is clamped by a C clamp positioned on the horizontal member of the further longitudinal frame 29 while the other rests on the nearer frame 31. In other words, the door has three points of anchorage and one point of support and it will be seen that the extended portion overhangs the side of the base. A beam 32 may be inserted through the slot 14 along this side of the base and a jack 62, to the ram of which is secured a C clamp fixed to this extended portion of the door, may be supported by the projecting end of the beam which serves as a bracket. An arrangement such as that illustrated utilizing a hydraulic jack of the push-pull type is adaptable to pull the extended part of the door construction into alignment. By varying the length of the projecting portion of the bar and the angle at which it lies a wide variation in position for jack 62 is provided for. The space below the floor 10 between the flanges 12 is substantially unobstructed in the horizontally plane of said slot to permit such adjustment of the position of the bar. The slot 14 shown adjacent the transverse frame 25 may be utilized in a similar manner to provide a projecting bracket useful for acting on a member secured in overhanging relation to that frame or to a beam carried thereby, either for an additional point of anchorage or as a base for the application of force.

In the preferred construction shown two slots 14 are provided along each side of the base and one at each end. A beam 32 may be extended through a pair of slots in any one of the positions indicated by dotted lines in Fig. 9. Reference to Fig. 4 shows that, while the height of the slots closely corresponds to the depth of the beam, they are elongated to permit considerable variation in the direction in which it is inserted. To provide an extended bearing for the beam the margins of the slots may be flanged inwardly as shown. It has been stated above that the space beneath the floor 10 is substantially unobstructed in the horizontal plane of the slots. In order to provide a firm bearing for an inserted beam and to support it substantially horizontally, particularly when it is inconvenient to extend it through a pair of slots, longitudinal bearing strips 52 and transverse bearing strips 54 (see Fig. 10), preferably in the form of box-like sections welded in position, may be disposed within the hollow of the base at either side of this plane.

While the reader's attention is directed to the base, it will be convenient to call attention to the fact that in the construction shown the left-hand end of the base projects for a short distance beyond frame 25 and then slopes downward. The projection provides a horizontal supporting surface outward of the frame to receive a jack base while keeping the frame generally at the end and convenient to the workman while the curved wall provides an upwardly facing diagonal surface permitting the positioning of a jack base thereagainst to dispose the ram in an upwardly and outwardly extending line for the exertion of force along such a line on a part mounted on the machine with a portion overhanging to the left of the figures.

Fig. 5 illustrates an application wherein a front fender is anchored to the appliance in an overhanging position so that a mechanic has free access to either the inner or outer section of the fender. Herein the forward portion of the fender along the inner edge is secured by a horizontally positioned C clamp on a beam 32 secured to the transverse frame 25. A beam 32 is secured to parallel uprights of the frames 29 and 31 and supports a horizontally positioned C clamp for engaging the lower edge of the fender while the upper edge is secured by a vertically positioned C clamp along the horizontal portion of the longitudinal frame 31. Obviously the position of the fender may be varied due to the wide adjustability provided, and the mechanic not only has access from the nearer side in the drawings but may enter from the further side through the space between the transverse frame 25 on the one hand and the longitudinal frames 29 and 31 on the other.

In the previous examples anchorage to the transverse frame 25 is secured through a beam or "door bar" attached thereto. In Fig. 6 we have shown a front fender held in position by means of three clamps, two in vertical position, one on the horizontal portion of longitudinal frame 31, and the other on the beam 32 supported on the horizontal member of the transverse frame 25. The lower portion of the fender, however, is secured by a horizontally disposed clamp which is anchored directly to the nearer upright of the frame 25. The beam 32 carried by this frame extends beneath the edge of the fender to give it an underriding support and another beam is secured to the front faces of the longitudinal frames 29 and 31 to support the fender adjacent its other end. This arrangement permits a mechanic to use hydraulic pressure on the fender or a pneumatic hammer could be used.

In Fig. 7 there is illustrated an application in which a beam is supported along the curved shoulders of the longitudinal frames 29 and 31. In this case a trunk lid is shown, the nearer portion of which is secured by vertical clamps to the bar 32 carried by the transverse frame 25. The bar 32 at the right in the figure is bolted to the frames 29 and 31 along the curve connecting the horizontal and vertical portions, which places the bar and the clamps carried thereby at an angle so that the high crowned upper section of the trunk lid can be anchored without distorting the outer panel surface when pressure is applied. By the use of such an arrangement a trunk lid can be clamped in any position necessary for straightening or metal finishing. We have herein shown a power spoon 62 as shown in Ferguson Patent 2,211,341 as inserted in the space between the transverse and longitudinal frames for operating on the portion of the panel extending between the same and deriving its support from the rigid floor 10 of the base.

In Fig. 8 we have shown two beams, each anchored adjacent one end to the horizontal portion of the transverse frame and adjacent the other end to the horizontal portion of the longitudinal frame adjacent the same side of the machine, thus providing a rigid horizontal supporting structure, to which we have here illustrated a radiator core secured by four vertical clamps, two carried by each of the bars. Obviously, the effective width of this support may be varied by varying the position along the horizontal branch of frame 25 where anchorage is effected, with such compensating adjustment in the anchorage to the longitudinal frames as may be necessary or desired. A jack 62 is shown between the radiator core and the base of the machine. A radiator core of any size, whether from a truck or passenger car, can be straightened by such an arrangement.

The applications of the appliance are of practically infinite variety and we have shown merely a few to suggest the possibilities.

We are aware that the invention may be embodied in other specific forms without departing from the spirit or essential attributes thereof, and we therefore desire the present embodiment to be considered in all respects as illustrative and not restrictive, as is in fact clear in several matters from the description itself. Reference is to be had to the appended claims to indicate those principles of the invention exemplified by the particular embodiment described and which we desire to secure by Letters Patent.

We claim:

1. A device for positioning automobile frame or body parts while they are being worked upon for use in conjunction with clamps and clamp-supporting beams comprising a base adapted to support strain, a rigid frame of the general form of an inverted U arising therefrom at an end thereof and a pair of similar frames parallel to one another and substantially coplanar with uprights of the first frame but spaced substantially therefrom to provide an intervening working space, the frames presenting between their side faces substantially continuously throughout their length slots providing for the passage therethrough of anchoring bolts for such clamps or beams.

2. A device for positioning automobile frame or body parts while they are being worked upon for use in conjunction with clamps and clamp-supporting beams, said device comprising a base with depending flanges which is adapted to support strain, a rigid frame in the general form of an inverted U arising therefrom at one end thereof, a clamp-supporting structure remote from said end, the flange at said end having an opening to receive a beam to project therefrom as a bracket adjacent the frame.

3. A device for positioning automobile frame or body parts while they are being worked upon for use in conjunction with clamps and clamp-supporting beams, said device comprising a base with depending flanges which is adapted to support strain, a rigid frame in the general form of an inverted U arising therefrom at one end thereof, and a pair of similar frames remote from said end and extending adjacent the sides of the base, the flange along one of said sides having an opening to receive a beam to project therefrom as a bracket to oppose parts secured to said frames.

4. A device for positioning automobile frame or body parts while they are being worked upon for use in conjunction with clamps and clamp-supporting beams comprising an elevated base which is adapted to support strain, a rigid frame in the general form of an inverted U arising therefrom at one end thereof, a pair of similar frames remote from said end and extending adjacent the sides of the base, and means at one of said sides for suspending a beam partially inserted beneath the base with its outer end projecting as a bracket to oppose parts secured to said frames.

5. A device for positioning automobile frame or body parts while they are being worked upon for use in conjunction with clamps and clamp supporting beams comprising a base adapted to support strain, a rigid transverse frame across an end thereof having a horizontal top longitudinally slotted to receive clamping bolts and a pair of frames of the general form of an inverted U and of substantially the same altitude as the transverse frame disposed parallel to each other in spaced relation along the sides of the base substantially remote from the transverse frame to provide an intervening working space, the latter frames presenting bolt-receiving slots extending throughout their horizontal portions.

6. A device for positioning automobile frame or body parts while they are being worked upon for use in conjunction with clamps and clamp supporting beams comprising a base adapted to support strain, a rigid transverse frame across an end thereof having a horizontal top longitudinally slotted to receive clamping bolts and a pair of frames of the general form of an inverted U and of substantially the same altitude as the transverse frame disposed parallel to each other in spaced relation along the sides of the base substantially remote from the transverse frame to provide an intervening working space, the latter frames presenting bolt-receiving slots extending throughout their lengths.

7. A device for positioning automobile frame or body parts while they are being worked upon comprising a base having a floor adapted to support strain, a rigid transverse frame across an end thereof having a horizontal top and a pair of frames of the general form of an inverted U and of substantially the same altitude as the transverse frame disposed parallel to each other in spaced relation along the sides of the base substantially remote from the transverse frame to provide an intervening working space and means at the sides of the base substantially in the planes thereof for suspending a beam with its end projecting under the floor, the under side of the floor being substantially unobstructed in the horizontal plane of said opening to permit said end to extend across the floor and at differing angles.

8. A device for positioning automobile frame or body parts while they are being worked upon comprising a base having a floor adapted to support strain, a rigid transverse frame across an end thereof having a horizontal top and a pair of frames of the general form of an inverted U and of substantially the same altitude as the transverse frame disposed parallel to each other in spaced relation along the sides of the base substantially remote from the transverse frame to provide an intervening working space and means at said end and at the sides of the base substantially in the planes thereof for suspending a beam with its end projecting under the floor, the under side of the floor being substantially unobstructed in the horizontal plane of said opening to permit said end to extend across the floor and at differing angles.

9. A device for positioning automobile frame or body parts comprising a base having an elevated floor adapted to support strain and depending flanges, elements rising from said floor having provision for clamping thereto parts to be operated on, the flanges of the base having openings therein through pairs of which a beam may be inserted to extend secantwise across the base with an end projecting as a bracket to oppose parts secured to said elements.

10. A device for positioning automobile frame or body parts comprising a base having an elevated floor adapted to support strain and depending flanges, elements rising from said floor having provision for clamping thereto parts to be operated on, a flange of the base having an opening therein into which a beam may be inserted with an end projecting as a bracket to oppose parts secured to said elements, and means within the base presenting bearing surfaces substantially in the planes of the upper and lower margins of said openings additionally to support the inserted beam.

11. A device for positioning automobile frame or body parts while they are being worked upon for use in conjunction with clamps and clamp-supporting beams, said device comprising a base having an elevated floor adapted to support strain, a rigid, transversely disposed frame in the general form of an inverted U arising therefrom adjacent one end thereof, a clamp-supporting structure remote from said end and defining a working space between the same and said frame, the floor at said one end extending horizontally for a short distance beyond said frame and terminating in a downwardly and outwardly sloping surface.

12. A device for positioning automobile frame or body parts while they are being worked upon for use in conjunction with clamps and clamp-supporting beams, said device comprising a base having an elevated floor adapted to support strain, a rigid, transversely disposed frame in the general form of an inverted U arising therefrom adjacent one end thereof, a clamp-supporting structure remote from said end and defining a working space between the same and said frame, the said one end of the base presenting a downwardly and outwardly sloping surface outward of said frame.

13. A device for positioning automobile frame or body parts while they are being worked upon for use in conjunction with clamps and clamp-supporting beams comprising a base adapted to support strain, having arising therefrom a plurality of spaced anchorage frames of inverted U-shape and of substantially the same altitude, each frame comprising a pair of spaced channels having opposed flanges defining between them a slot substantially coextensive with the base and legs of the U and presenting a horizontal part and vertical parts merging along easy curves of substantial radius.

HENRY W. PORTER.
WILLIAM H. FERGUSON.

REFERENCES CITED

The following references are of record in the file of this patent:

UNITED STATES PATENTS

| Number | Name | Date |
|---|---|---|
| 103,347 | Lepp | May 24, 1870 |
| 681,217 | Hawkins | Aug. 27, 1901 |
| 713,875 | Hall | Nov. 18, 1902 |
| 1,002,741 | Nelson | Sept. 5, 1911 |
| 1,345,177 | Heckathorn | June 29, 1920 |
| 1,363,020 | Shewalter | Dec. 21, 1920 |
| 1,649,388 | Cacha | Nov. 15, 1927 |
| 2,275,894 | Ferguson | Mar. 10, 1942 |
| 2,312,914 | Koszeghy | Mar. 2, 1943 |

FOREIGN PATENTS

| Number | Country | Date |
|---|---|---|
| 469,261 | Great Britain | July 12, 1937 |